Feb. 27, 1923.

A. P. BRUSH ET AL 1,446,545

DIFFERENTIAL GEARING

Filed Mar. 8, 1919

Inventors
Alanson P. Brush
Owen M. Nacker

By Whittemore Hulbert & Whittemore

Attorneys

Patented Feb. 27, 1923.

1,446,545

UNITED STATES PATENT OFFICE.

ALANSON P. BRUSH AND OWEN M. NACKER, OF DETROIT, MICHIGAN.

DIFFERENTIAL GEARING.

Application filed March 8, 1919. Serial No. 281,517.

*To all whom it may concern:*

Be it known that we, ALANSON P. BRUSH and OWEN M. NACKER, both citizens of the United States of America, residing at Detroit, in the county of Wayne and State of Michigan, have invented certain new and useful Improvements in Differential Gearing, of which the following is a specification, reference being had therein to the accompanying drawings.

The invention relates to differential gearings such as are employed in vehicle drive axles and for similar purposes, and the invention comprises the construction as hereinafter set forth.

Figure 1:
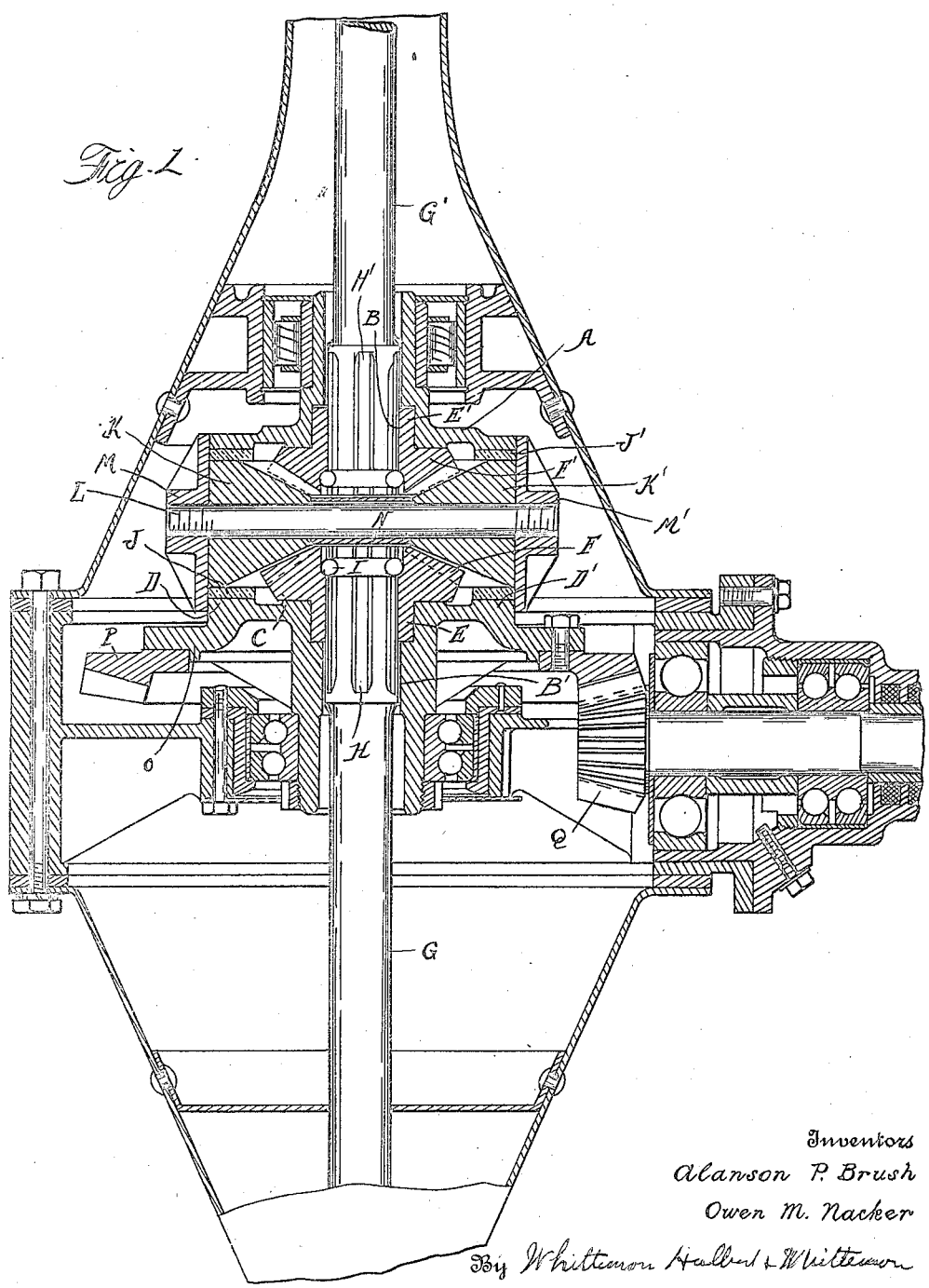
Figure 1 is a horizontal section through the axle housing and differential gearing.
Figure 2:
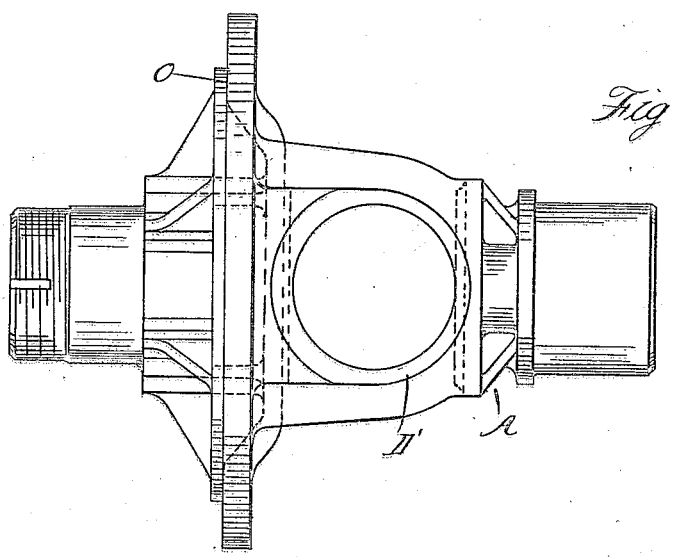
Figure 2 is an elevation of the frame member.
Figure 3:
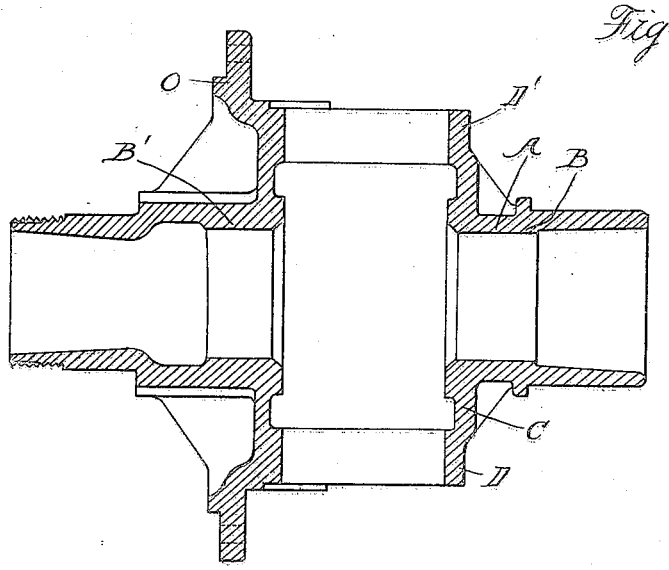
Figure 3 is a longitudinal section therethrough.

A is a frame for the gearing, preferably an integral member having the aligned bearing portions B and B' at opposite ends of a central open-ended box-like casing C, and the opposite sides of this casing C are provided with aligned annular bearings D and D'. The bearings B and B' are adapted to receive the hubs E and E' of the bevel gears F and F', and the openings in the box-like frame are of sufficient size for the admission of these gear wheels and the engagement of the same with the bearings B and B'. G and G' are the axle shafts, having the splined inner ends H and H' which are adapted to engage corresponding splineways in the hubs E and E'. I are split rings formed of complementary segments which engage grooves at the inner ends of the splined portions H and H', while the inner ends of the gear wheels F and F' are recessed to receive the ring segments and to hold the same in engagement with said grooves. J and J' are bushings in the annular bearings D and D'. K and K' are pinions insertable through the bushings J and J' into engagement with the gear wheels F and F', said pinions having at their rear ends bearing portions, which are journaled in said bushings. L is a journal pin insertable through aligned bores in the pinions K and K', the opposite ends of said pin being threaded; and M and M' are cap members screwed upon the threaded ends of said pin bearing against the rear ends of the pinions K and K' and also seated on the annular bearings D and D'. N is a spacer bearing block which is sleeved upon the pin L and is interposed between the ends of the shafts G and G' to hold the same from endwise movement towards each other.

With the construction as above described it will be understood that the various elements of the differential may be readily engaged with each other and when completely assembled the gear wheels and pinions will be held from displacement, while the splined shafts are also locked from endwise movement in either direction. It will also be noted that the diameter of the bearing portion of each pinion which engages the bushing is greater than the mean diameter of the toothed portion thereof. This together with the relatively large end bearing surface upon the cap members M and M' will introduce a considerable frictional resistance to the turning of the gears, which is highly desirable as it renders the mechanism to a limited extent irreversible. In other words, while the differential can function in its normal manner to equalize the driving force transmitted to the two wheels, in case one wheel should lose its traction this will not relieve all driving force from the other wheel.

The member A is provided with the usual mounting O for the ring gear P which is in mesh with the driving pinion Q.

In addition to the advantage of partial irreversibility and also facility in assembly, the enlarged journal bearings on the pinions impart greatly increased strength to the structure for transmission of the driving torque from the ring gear frame to the axle shafts. Thus all shearing stress is relieved from the pin L. The latter functions only to properly align the pinions and to hold the cap members in engagement therewith.

What we claim as our invention is:

1. In a differential gearing, the combination with aligned axle shafts and bevel gear wheels mounted thereon, of a pinion in mesh with said gear wheels having a journal portion other than the teeth which is the maximum diameter of the pinion, and a bearing for said journal portion through which said pinion can be inserted into engagement with the gear wheels.

2. In a differential gearing, the combination with aligned axle shafts and gear wheels mounted on said shafts, of a pinion for engaging said gear wheels having a journal portion at its rear end which is of the maximum diameter of the pinion, a bearing for said journal portion through which the pinion can be inserted, and a cap for bearing against the end of said pinion and holding the same in engagement.

3. In a differential gearing, the combination with aligned axle shafts and gear wheels mounted on said shafts, of a pinion in mesh with said gear wheels having a journal portion at its rear end of the maximum diameter of the pinion, a central pin on which said pinion is also journaled, and a cap for bearing on the end of said pinion secured to said pin.

4. In a differential gearing, the combination with aligned axle shafts and gear wheels mounted thereon, of a pair of pinions in mesh with said gear wheels on diametrically opposite sides thereof, each of said pinions having a journal portion at the rear end thereof which is of the maximum diameter of the pinion, bearings for said journal portions through which said pinions may be inserted into engagement with said gear wheels, a pin extending through aligned central bores in said pinions, and caps secured to the opposite ends of said pin seated on the ends of said bearings and also forming bearings for the ends of said pinions.

5. In a differential gearing, the combination with aligned axle shafts and gear wheels mounted thereon, of a pair of pinions engaging said gear wheels on diametrically opposite sides thereof, each of said pinions having a tooth portion at its inner end and a journal portion at its outer end which is of the maximum diameter of the pinion, a frame in which said gear wheels are journaled having journal bearings for said pinions and through which the pinions are inserted into engagement with gear wheels, a pin extending through aligned bores in said pinions and having a threaded portion at one end, and caps secured by said pin, one of said caps being threaded to engage the threaded portion of the pin, said caps bearing against the ends of the pinions and being seated on the ends of said journal bearings.

6. A differential gearing, comprising a frame member having aligned journal portions and an open ended box-like portion therebetween, gear wheels in engagement with said journal bearings, said corresponding wheels being insertable through the open end of said box-like portion, axle shafts having their inner ends splined and in engagement with said gear wheels, said shafts having annular grooves at their inner ends, segmental rings engaging said annular grooves withdrawable into recesses in said gear wheels, pinions engaging said gear wheels on diametrically opposite sides thereof, each of said pinions having a journal portion of the maximum diameter of the pinion, bearings in said frame for said journals through which said pinions can be inserted into engagement with said gear wheels, a pin extending through aligned bores in said pinions, a spacer block sleeved on said pin and arranged between the ends of said axle shafts, and caps secured to the opposite ends of said pin forming end bearings against said pinions and seated on the ends of the journal bearings therefor.

7. In a differential gearing, the combination with aligned axle shafts and bevel gear wheels mounted thereon, of a pinion in mesh with said gear wheels having a journal portion, a frame in which said gear wheels are journaled, and means for offering a relatively high frictional resistance to the turning of said pinion, said means including a bearing upon said frame and in engagement with said journal portion and a member upon said frame and in engagement with the outer end of said pinion.

8. In a differential gearing, the combination with aligned axle shafts and bevel gear wheels mounted thereon, of a pinion in mesh with said gear wheels having a journal portion at its rear end which is of the maximum diameter of the pinion, and a bearing for said journal portion through which said pinion can be inserted.

In testimony whereof we affix our signatures.

ALANSON P. BRUSH.
OWEN M. NACKER.